(12) United States Patent
O'Dell

(10) Patent No.: US 7,516,602 B1
(45) Date of Patent: Apr. 14, 2009

(54) ATTACHABLE TRIMMER/EDGER FOR A LAWNMOWER

(76) Inventor: Dennis O'Dell, 2924 Downey St., Independence, MO (US) 64055

( * ) Notice: Subject to any disclaimer, the term of this patent is extended or adjusted under 35 U.S.C. 154(b) by 0 days.

(21) Appl. No.: 11/960,225

(22) Filed: Dec. 19, 2007

(51) Int. Cl.
*A01D 34/00* (2006.01)

(52) U.S. Cl. ...................................................... 56/16.9

(58) Field of Classification Search ................. 56/16.9, 56/17.1, 17.5, 13.7, 12.7; 172/15, 14
See application file for complete search history.

(56) References Cited

U.S. PATENT DOCUMENTS

| | | | |
|---|---|---|---|
| 2,707,858 A | | 5/1955 | Norton et al. |
| 3,053,035 A | | 9/1962 | Earley |
| 3,125,165 A | | 3/1964 | Boudreaux et al. |
| 3,319,406 A | | 5/1967 | Miles |
| 3,531,922 A | | 10/1970 | Hansen |
| 3,604,208 A | | 9/1971 | Borunda |
| 3,698,165 A | | 10/1972 | Keesee |
| 3,789,591 A | | 2/1974 | Emery |
| 4,170,099 A | * | 10/1979 | Owens .......................... 56/16.9 |
| 4,453,372 A | | 6/1984 | Remer |
| 4,551,967 A | * | 11/1985 | Murcko ....................... 56/13.7 |
| 4,642,976 A | | 2/1987 | Owens |
| 4,715,169 A | * | 12/1987 | Ould ........................... 56/16.9 |
| 5,497,606 A | * | 3/1996 | Baxter .......................... 56/16.9 |
| 5,857,315 A | | 1/1999 | Keane |
| 6,085,507 A | * | 7/2000 | Keane .......................... 56/16.9 |
| 6,434,920 B1 | * | 8/2002 | Keane .......................... 56/16.9 |
| 6,701,700 B2 | | 3/2004 | Keane |
| 6,779,325 B1 | * | 8/2004 | Robillard, II ................. 56/12.7 |
| 7,165,382 B2 | * | 1/2007 | Mitchell, Jr. ................. 56/12.7 |
| 2003/0093983 A1 | * | 5/2003 | Savard et al. ................. 56/12.7 |

FOREIGN PATENT DOCUMENTS

WO    WO02076181 A1  *  10/2002

\* cited by examiner

*Primary Examiner*—Árpád Fábián-Kovács
(74) *Attorney, Agent, or Firm*—Daniel S. Polley, P.A.

(57) ABSTRACT

A trimmer/edger attached to a conventional lawnmower and using the lawnmower's power source. The edger/trimmer cutting element is attached to the front of the lawnmower. A rotatable cable runs from the cutting element to a contact member attached at an opening on the lawnmower housing. A planar disc is located above the conventional grass cutting blade on the same shaft that supports the cutting blade. Upon powering up the lawnmower, both the cutting blade and planar disc begin to rotate. Upon squeezing an operating lever, a rotatable portion of the contact member comes in contact with the rotating disc causing the rotatable cable to turn, which in turn causes the cutting head, having cutting strings attached, to spin and be able to be used as an edger or trimmer, depending on its position, at the same time the lawnmower is being used to cut the grass.

25 Claims, 7 Drawing Sheets

ATTACHABLE TRIMMER/EDGER FOR A LAWNMOWER

FIELD OF THE INVENTION

The invention relates generally to lawnmowers and more particularly to an edger/trimmer attachment for a lawn mower.

BACKGROUND OF THE INVENTION

Typically an individual cutting his or her grass uses a lawnmower for such project. However, for the edge of the grass or areas near an object (i.e. house, tree, plants, etc.) the individual stops using the lawnmower and uses other lawn grooming devices. For example, a separate and independent edger is typically used for cutting the edge of the grass. For areas close to objects a separate and independent trimmer is usually used. Accordingly, the individual is required to have to two or three separate units each time he or she cuts the grass. In addition, to the increased amount of time needed to cut, edge and trim the grass for using three independent devices, each device also requires separate operation, it's own power source, and its own fuel supply.

Additionally, hand held string trimmers are known to be difficult to maneuver, while gas trimmers are known to be loud. Furthermore, using an electric trimmer in wet terrain can create a safety hazard. The present invention overcomes the above problems of using two or three separate and independent lawn grooming devices typically associated when cutting the grass.

SUMMARY OF THE INVENTION

The present invention provides a trimmer/edger which is removably attached and detached to a conventional lawnmower and can be powered by the power source used by the lawn mower as well as being used while the lawnmower is in use. In the preferred embodiment, the edger/trimmer cutting member is preferably attached to the front of the lawnmower housing and extends outward therefrom. A cable runs from the cutting element of the edger/trimmer member to a movable contact member. The contact member can be attached to the lawnmower at the grass exiting side aperture of a conventional lawnmower. An activation cable extends from the contact member upwards, with the other end of the activation cable being connected to an operating lever, such as, but not limited to, a lever similar to a bicycle brake lever, which is secured to the handle or gripping area of a conventional lawnmower.

The conventional shaft of the lawnmower having the cutting blade attached at the bottom thereof has a separate disc or other rotatable object also secured thereto above the cutting blade. As conventionally known, powering up of the lawnmower, causes the cutting blade to spin. As the disc is also secured to the same shaft as the cutting blade, the disc also turns and uses the same power source as the cutting blade, without requiring its own separate power/fuel source.

Thus user pushes the lawnmower as normally used. When it is desired to edge or trim the operating lever, preferably within reach of the user's hand(s), so that he or she can also continue pushing the lawnmower. Similar to a bicycle brake, squeezing the operating lever causes the cable running from the lever to the contact member to move the contact member downward, such that a rotation portion of the contact member comes into contact with the spinning disc attached to the cutting blade shaft. Such contact causes the rotation portion to spin (turn) which controls (turns) an internal cable running from the contact member to the cutting element, which in turn causes the cutting element to spin and perform its desired function (trimming, edging, etc.). Upon releasing pressure on the operating lever, the rotation portion of the contact member is moved upward and no longer contacts the spinning disc, which in turn causes the cutting element to stop spinning. However, while the lawnmower is on (i.e. cutting blade is spinning), the shaft secured disc remains spinning, and a simple maintained squeeze of the operating levers allows the trimmer/edger to be quickly and easily put back in use.

The cutting portion of the present invention edger/trimmer is pivotable from an edging position to a cutting position. In one embodiment, such positioning is simply performed through the loosening and tightening of an adjustment wing nut or similar device.

Accordingly, the user of the present invention is able to edge and/or trim his or her yard while at the same time he/she is cutting such yard. This permits a reduction in the amount of time needed for cutting the yard as well as reducing the amount of fuel required and physical devices needed to achieve such purposes. When the edging or cutting portion is not required, the user simply unsqueezes the operating lever which causes the contact member to no longer come into contact with the rotating shaft secured disc. Once this contact is discontinued the internal cable member no longer rotates which in turn causes the cutting element of the edger/trimmer to also no longer rotate. However, as mentioned above the edger/trimmer remains in position for easy activation for whenever needed by the user.

DETAILED DESCRIPTION OF THE DRAWINGS

Figure 1:
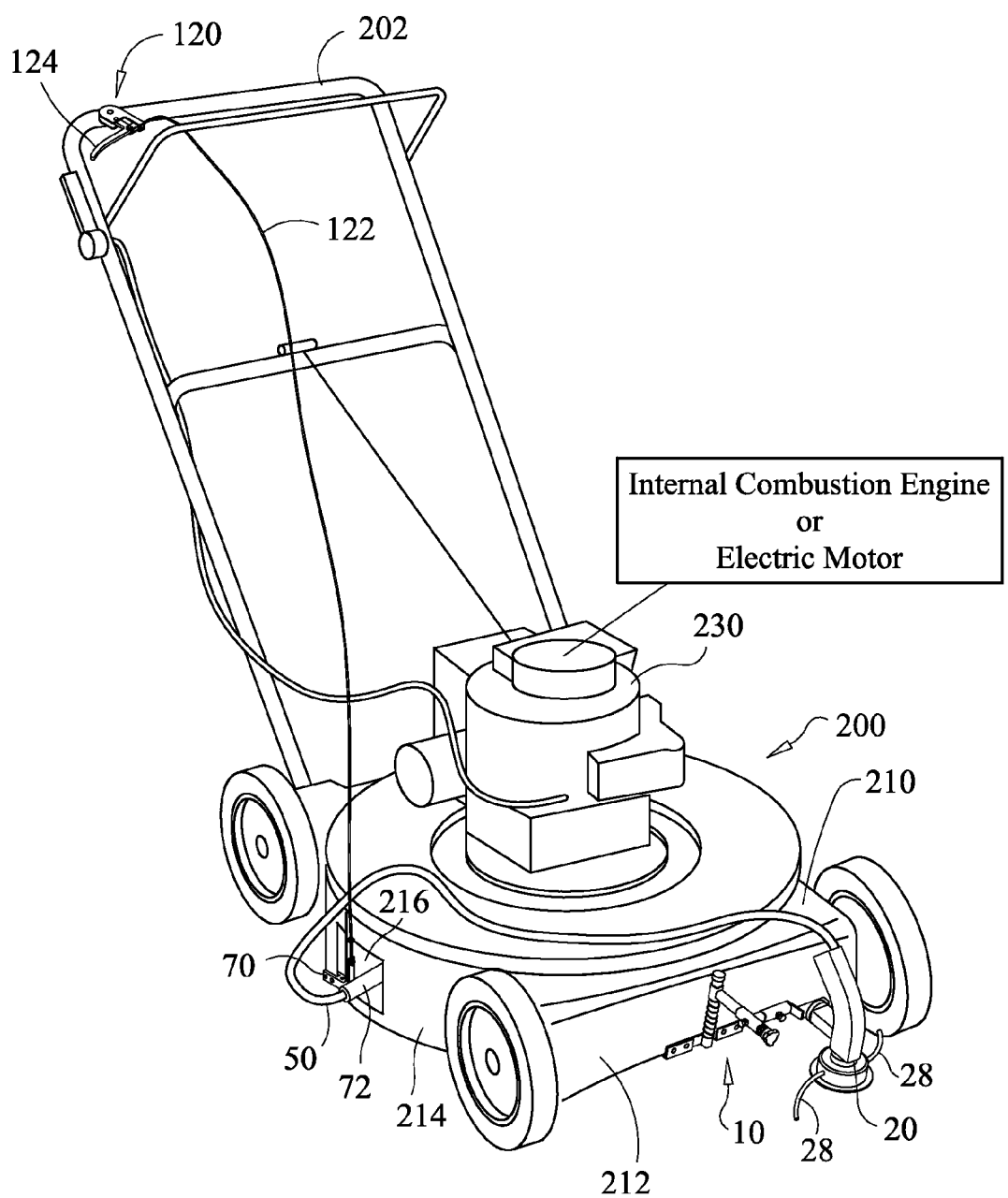
FIG. 1 is a perspective view of the present invention edger/trimmer shown attached to a conventional lawnmower in accordance with the present invention.

As seen in the Figures, the present invention provides an edger/trimmer generally referenced as trimmer/edger 10 or edger/trimmer 10 (also collectively referred to herein as "edger 10" or "trimmer 10") and which is removably attached and detached to a conventional lawnmower 200. As will be described in detail below, edger 10 can be powered by the power source used to power lawnmower 200 and can be used by a user at the same the user is using lawnmower 200.

In a preferred embodiment, a cutting member 20 of trimmer/edger 10 is preferably attached to a front portion 212 of housing 210 of lawnmower 200 and extends outward therefrom. In the preferred attachment configuration, no holes are required to be drilled into housing 210. Cutting member 20 includes a cutting element 24 secured to an extension arm 36 which is secured to a pivotable arm 34. Arm 34 can be connected to a bracket 42 which in conjunction with conventional mounting clamps 40, clasps, tightening screws, etc. can secure cutting member 20 at front portion 212. In one preferred embodiment, when securing cutting member 20, u-shaped mounting clamps 40 are provided and receive/support maintain bracket 42 (such that their respective apertures are aligned) to receive tightening screws 41, Tightening screws 41 are sufficiently tightened to retain mounting clamps 40 and mounting bracket 42 at front portion 212 of housing 210 (with mounting bracket 42 preferably centered with respect to housing 210). The receiving portion of u-shaped clamps 40 can be selected to be large enough (i.e. ½", etc. and all smaller and sizes are also within the scope of the invention) such that it can receive various sized housing edges, as this dimension may vary between different lawnmower manufacturers and/or different lawnmower types.

Figure 2:
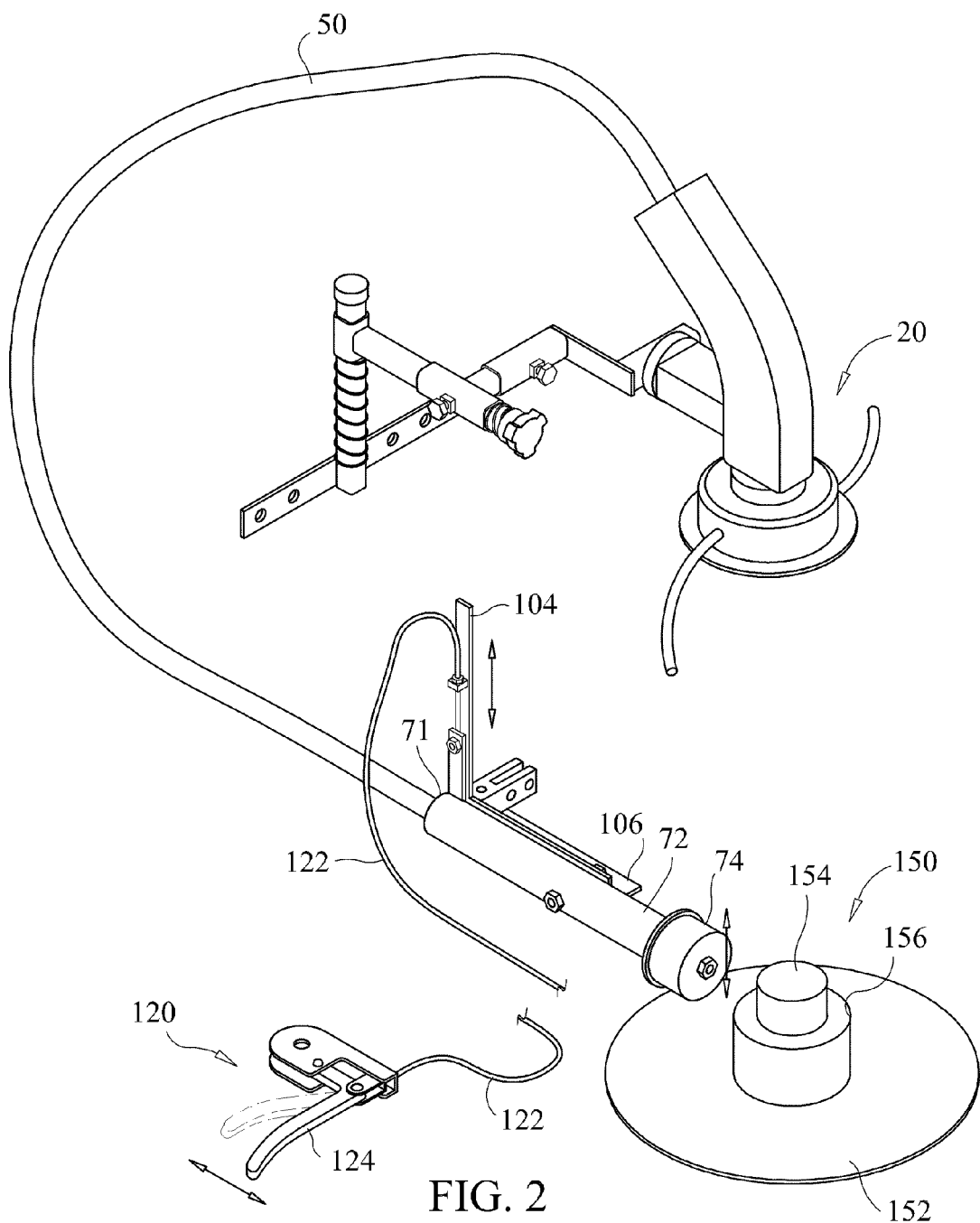
FIG. 2 is a perspective close up view of the present invention edger/trimmer shown in FIG. 1.

Through tightening and loosening of screws 38, 35 and 32, the position (vertical, horizontal) of cutting element 24 with respect to housing 210 can be adjusted (discussed further below). Additionally, in connection with a tightening screw, adjustment bold and wing nut 37 or similar mechanism, cutting element 24 can be adjusted and maintained in an edging position (i.e. rotatable cutting head 26 is at least substantially vertically oriented) or cutting element 24 can be adjusted and maintained in a trimming position (i.e. rotatable cutting head 26 is at least horizontally oriented—as in FIG. 2). When the desired position for cutting head 26 is selected, bolt/wing nut 37 is tightened to maintain the position of cutting head 26. When nut 37, screw, etc. is loosened, member 39 can be rotated to adjust the position of cutting head 26. Once the new desired position is reached for cutting head 26, nut 37 is again tightened to maintain the new position for cutting head 26. It should be recognized that various conventional adjustment mechanism can be used to change the position of cutting head 26 and all are considered within the scope of the invention.

In addition to adjusting the position of cutting head 26 as described in the preceding paragraph, the entire cutting element can be rotated from a left front side to a right front side with respect to housing 210 and similarly from the right front side to the left front side, while maintaining the other position settings for cutting element 24 with respect to front housing portion 212. To switch the side for cutting element 24 with the cutting element secured to housing portion 212, the user preferably grabs and pulls back on sleeve 31 and/or post 33, while applying pressure at know 38 (preferably with his or her thumb), which pulls post 36 (since sleeve 29 is tightened to post 36 by screw 32) toward the user and compresses spring 53. The pulling of post 36 towards the user, causes its substantially "c" or "u" shaped end 55 to clear a flange or nut 51 attached to post 47, which allows post 36 to rotate, thus, permitting cutting element 24 to be moved from the left side to the right side or from the right side to the left side. Once in the desired new position, releasing the pull on post 33 and/or sleeve 31 causes spring 53 to expand which moves end 35 over nut 51 again to prevent rotation of cutting element.

With bracket 42 secured in position to front housing portion 212, the length of how far cutting element 24 is from the center of housing 210 can be adjusted by loosening screw 35 and moving associated sleeve 31 along post 33 in the intended direction. Once at the desired location, screw 35 is tightened to maintain the position of sleeve 31 on post 33. The length cutting element 24 extends out from front housing portion 212 can be adjusted by loosening screw 32 and moving associated sleeve 29 along post 36 in the intended direction. Once at the desired location, screw 32 is tightened to maintain the position of sleeve 29 on post 36. The height of cutting element is controlled through loosening/tightening of screw 38, which applies pressure through an internal rod on vertical post 49 to maintain sleeve 47 in position on post 49. Support spring 43 can be provided to help maintain the position of sleeve 47 on post 49, especially when screw 38 has been loosened to prevent cutting element from dropping.

In the edging position, cutting strings 28 are preferably positioned such that they are located between the wheel and housing in a position where the strings do not hit the housing or wheel in use.

As mentioned above, cutting head 26 is rotatable and is connected to one end or otherwise in communication with a rotatable cable 52. Preferably, cable 52 is internally disposed within flexible outer cable cover or sheath 50. The connection point of cable 52 to rotatable cutting head 26 is preferably protected within connection member 25 of cutting member 20. Given their connection to each other, the rotation (spinning, turning, etc.) of cable 52, as will be discussed in detail below, causes cutting head 26 to also rotate and, thus, the attached cutting strings 28 are spinning at enough of a speed to edge or trim a desired area of a yard or lawn (i.e. depending on the position of cutting element 24 as discussed above).

The opposite end 54 of cable 52 is secured to a rotatable shaft 80 of a contact member 70 and in one non-limiting embodiment is secured to shaft 80 by a conventional connector, such as flex cable connector 100 secured at one end of shaft 80 and to end 54 of cable 52. Though not considered limiting, the shape of internal cable 52 can correspond to a shape of a receiving recess in connector 100. In one non-limiting embodiment, cable 52 can be substantially square in cross-sectional shape and received at its end 54 within a substantially square cross-sectional shaped recess of connector 100. Other shapes are also within the scope of the invention and all are considered within the scope of the invention.

Contact member 70 includes a housing 72, preferably cylindrical, having an externally disposed rotatable portion/member 74 secured to the end of housing 72 by rotatable shaft 80 and nuts 76 and 78. Shaft 80 can be preferably externally threaded for receipt, tightening and loosening of various locking nuts described above and below. In a preferred embodiment, an opposite end 98 of shaft 80 is connected to cable connector 100. Shaft 80 can be supported by one or more roller bearings, preferably two roller bearings 84 and 92 which are maintained in position on shaft 80 through nuts 84 and 86 (bearing 84) and nuts 94 and 96 (bearing 92). A sleeve 88 can be provided within housing 72 and can serve as positioner for roller bearings 84 and 92 and shaft 80 within housing 72. Sleeve 88 can be maintained in position by a screw 90 or other conventional attachment mechanisms.

Figure 3:
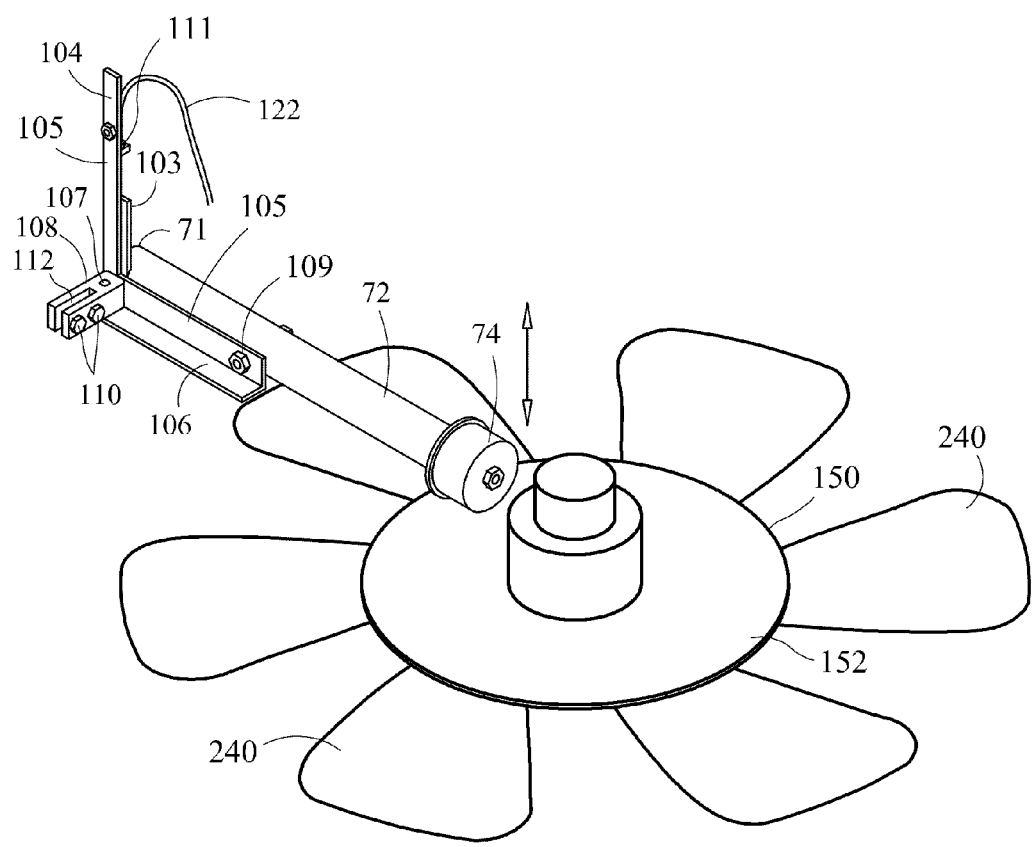
FIG. 3 is a perspective view of the relationship between the contact member and the disc member in accordance with the present invention.
Figure 4:
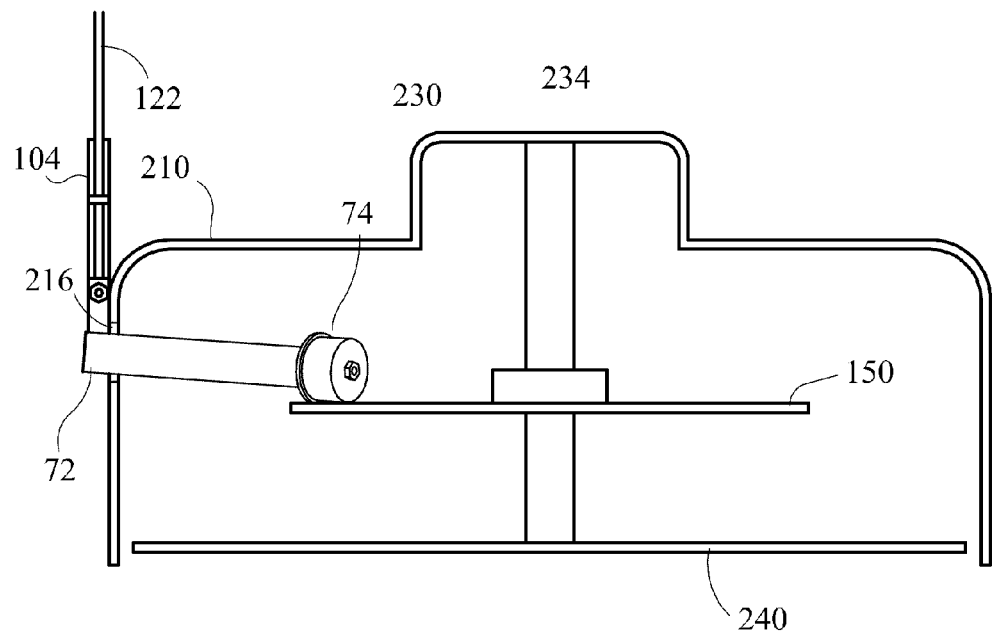
FIG. 4 is a cutaway front view of a portion of the lawnmower showing the relationship of the contact member, disc member and lawnmower cutting blade in a contact (activated position)
Figure 5:
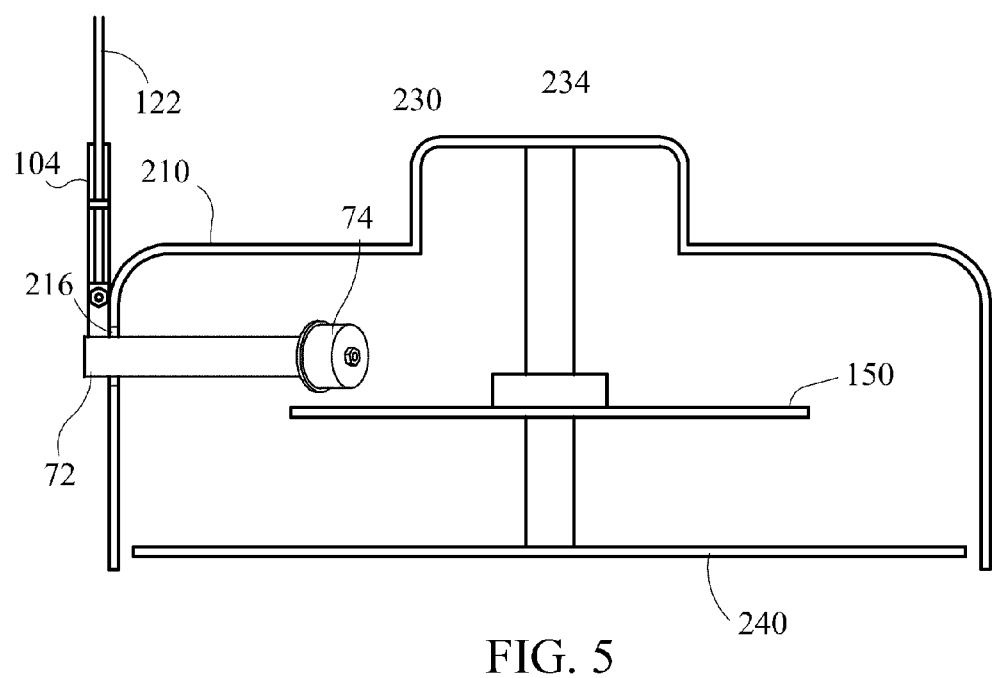
FIG. 5 is a cutaway front view of a portion of the lawnmower showing the relationship of the contact member, disc member and lawnmower cutting blade in a non-contact (unactivated position)
Figure 6:
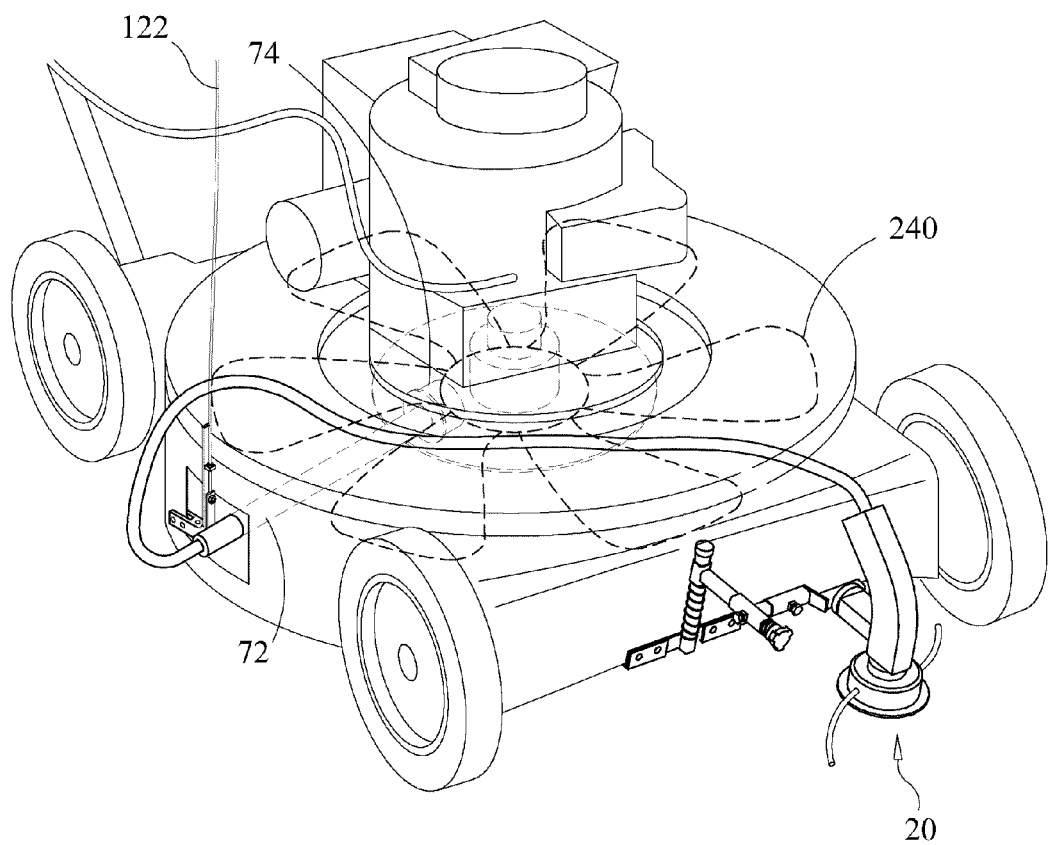
FIG. 6 is a perspective view of a portion of the lawnmower showing the present invention secured thereto.
Figure 7:
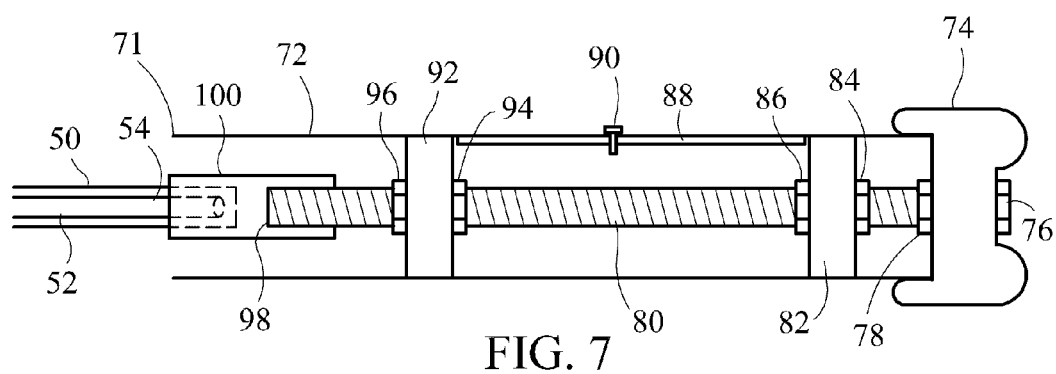
FIG. 7 is a cutaway view of the contact member showing a preferred embodiment for the providing energy to the cutting member from contact with the rotating disc member in accordance with the present invention.
Figure 8:
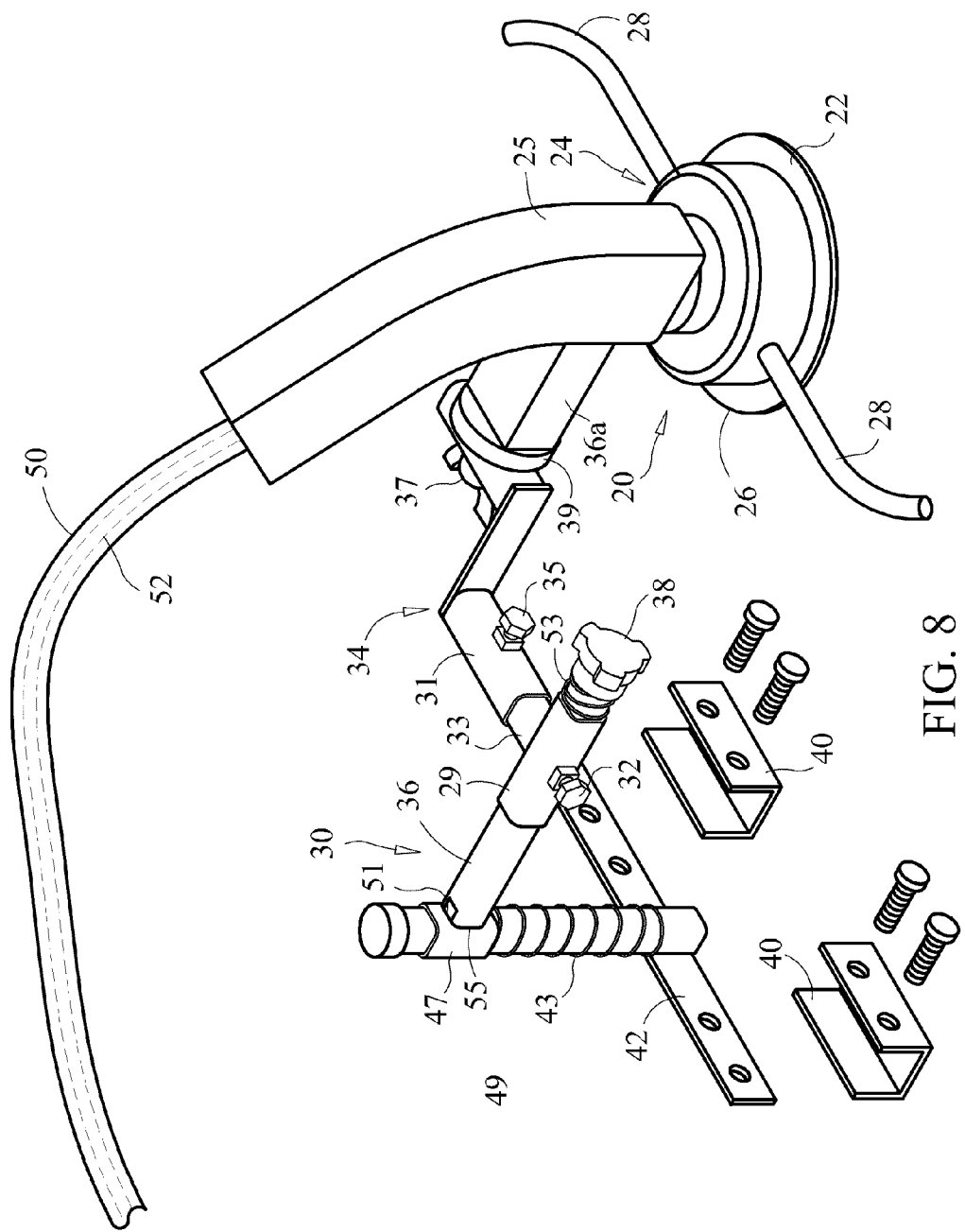
FIG. 8 is a perspective view of the cutting element and a preferred embodiment for the securement mechanism for attaching the cutting element to the front housing portion in accordance with the present invention.

As best seen in FIGS. 3 and 4, a rotating disc 150 secured to the vertical shaft 234 of conventional lawnmower 200 used to support the conventional grass cutting blade 240. Disc 150 preferably includes a substantially planar upper contact surface 152 and can be provided with center opening 154 for receipt of vertical shaft 234. In one assembly embodiment, cutting blade 240 is temporarily removed to permit shaft 234 to be receiving within opening 154 with disc 150 being slide up along shaft 234 at a point where it is preferably disposed above cutting blade 240 at a sufficient distance so as to not interfere with the normal operation of cutting blade 240. Disc 150 can be provided with a crown member 156 (such as 1" opening—one or more inner sleeve or insert ⅛"—set screw through crown and insert to contact shaft) to accept various sizes and shapes currently employed by lawnmower manufacturers for vertical shaft 234. Once disc 150 is properly positioned on shaft 234, a tightening member (not shown) can be provided to maintain the position of disc 150 on shaft 234. As non-limiting examples, the tightening member can include a tightening screw disposed through a portion of crown member 156 or other location which contacts shaft 234. Another non-limiting example, can include one or more locking nuts also secured to shaft 234 and disposed at least underneath disc 150 and preferably above and beneath disc 150. Other conventional devices for maintaining disc 150 in position on shaft 234 can be used and all are considered within the scope of the invention. Once disc 150 is properly secured to shaft 234, cutting blade 240 can be reattached to shaft 234 in its conventional position.

Figure 9:
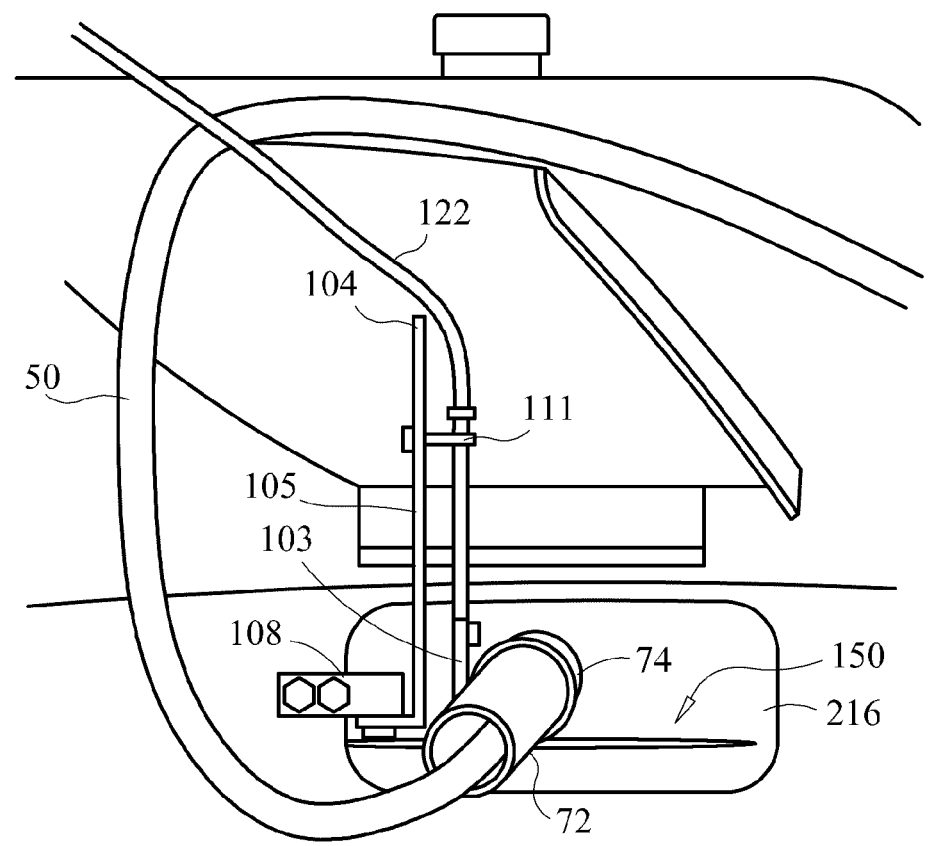
FIG. 9 is an elevational view of the side opening of the lawnmower housing showing the contact member secured to the opening.

As best seen in FIG. 9, contact member 70 is preferably attached to housing 210 at opening 216 of side 214. Opening 216 can be normally used as the grass exit aperture or where a grass catcher bag is secured. Additionally, where another convenient opening is provided on housing 210, contact member 70 can be secured at such other locations. All that is needed that contact member can come in contact with spinning disc 150, described further below, and without interfering with the normal operation of lawnmower 200.

In one embodiment, a contact support member 108 having one or more connection apertures 110 is attached to an edge (upper, side or lower) of opening 216 through conventional means, such as, but not limited to, mounting clamps, clasps, tightening screws, etc. When connecting, a portion of side 214 of housing 210 can be received within slot 112 of support member 108. An L-shaped bracket 105 can be provided with a base 106. Support member 108 is preferably secured to bracket 105 at base 106. Preferably the securement position of member 108 to bracket 105 is adjustable by loosening and tightening of an adjustment screw 107 (pivot pin, etc.) whose screw head can be accessible underneath base 106. Bracket 105 can be rotatably secured to contact member 70 at pivot screw (pin) 109. Cable or cord 122 can be (directly or indirectly) connected to an outer end of contact member 70 by any conventional securement mechanism. Cable/cord 122 can also be supported by its preferred connection to L-shaped bracket 105 at 111, which connection does not interfere with its operation of raising and lowering contact member 70. In one embodiment, a flange 103 can extend upward from contact member 70 and cord 122 is secured to flange 103.

The adjustable relationship between support member 108 and base 106 can be provided to allow for fine tuning the position of contact member 70 with respect to disc 150 such that rotating member 74 contacts upper surface 152 at substantially an approximately ninety (90°) angle, to maximize the amount of contact between member 74 and surface 152. It should be recognized that other angle relationship, though not preferred, can still be used and are also considered within the scope of the invention. The fine tuning of the positions of base member 106 and support member 108 is preferably provided in view of dimension variations between different lawnmower manufacturers.

As mentioned above, activating cable 122 can be directly or indirectly secured at its first end to or near the first end of contact member 70. Alternatively or additionally, the first end of cable 122 can be associated with an extension member, and the extension member is secured to contact member 70. The second end of cable 122 can be secured to an operating or activation mechanism 120 secured to a handle portion 202 of lawnmower 200.

Activation mechanism 120 includes an operating lever 124 which functions similar to a conventional bicycle brake lever. Thus, upon squeezing or other moving lever 124 downward toward handle 202, attached cable 122 is drawn in causing its opposite end or extension member secured to contact member 70 to pull upward on end 71 of contact member 70 which it is secured at (i.e. the end of contact member 70 opposite the location of rotating member 74). By pulling end 71 upward, contact member 70 rotates with respect to L-shaped bracket 105 at pin/screw 106, causing contact member 70 to move downward sufficient enough to contact disc 150 secured to shaft 234. Releasing lever 124 causes cable 122 to move out again, thus, dropping the upward position of end 71 of contact member to its original position, which in turn causes rotating member 74 to move upward and no longer contact disc 150.

Thus, in use, lawnmower 200 is powered up as conventionally known, which causes shaft 234 to begin spinning in order to spin cutting blade 240. As disc 150 is also secured to shaft 234, it also spins and benefits from the power derived for spinning cutting blade 240 and without any additional power source needed. Accordingly, while lawnmower 200 is one, disc 150 is spinning.

Preferably, prior to starting lawnmower 200, if the user believer that he or she will need to trim first, cutting member 24 can be positioned to its trimming position. Alternatively, if edging will first be required, cutting member 24 can be positioned and maintained in its edging position. When the user is at the point of needing trimming or edging, he or she squeezes activating lever 124 which as described above pulls up on end 71 of contact member 70 to lower rotating member 74 such that it contacts already spinning disc 150. As also mentioned above, preferably though not limiting, this contact can be at a substantially right angle (i.e. perpendicular relationship).

The spinning of disc 150 upon contact with member 74 causes member 74 to rotate, which in turn causes shaft 80 to which it is secured to also rotate within contact member 70. Shaft 80 is in communication with cable 52, such as, but not limited to, through connector 100. Thus, the rotating or turning of shaft 80 within contact member 70 causes cable 52 to also rotate or spin, preferably within its outer protective flexible cover or sheath 50. Cable 52 is in mechanical communication with cutting head 26 of cutting member 24, such that the turning or spinning of cable 52 causes cutting head 26 to similarly spin or turn. The turning, rotating, spinning, etc. of the above described components is at a speed sufficient enough that the one or more cutting strings 28 secured to cutting head 26 move at a sufficient speed to be used as trimmer or edger (i.e. depending on the position of cutting member 24). Thus, as the user is moving lawnmower 200 for the required trimming and/or edging, at the same time, lawnmower 200 is also being used conventionally as a lawnmower, since grass cutting blade 240 continues to spin is not interfered with through the operation of the attached edger/trimmer 10.

When an edging or trimming job area is completed, the user merely lets go of his or hold on activating lever 124, which as mentioned above, causes rotating member 74 to move upward and no longer contact spinning disc 150. As such, all of the above described spinning or rotating eventually ceases and lawnmower 200 can be used as a conventional lawnmower. As disc 150 continues to spin at all times, whenever edging or trimming is again needed, the user merely again squeezes activating lever 124 and the above described actions again occur to nearly instantly have edger/trimmer 10 available for its intended purpose, again while lawnmower 200 continues to be used for its conventional purposes.

Accordingly, the user of the edger/trimmer 10 is able to edge and/or trim his or tier yard, while at the same time he/she is cutting such yard. This permits a reduction in the amount of time needed for cutting the yard as well as reducing the amount of fuel, electricity, power, etc. required, as well as the number of separate lawn grooming devices needed to achieve such purposes. When the edging or cutting portion is not required, the user simply releases operating lever 124 which disactivates edger/trimmer 10. Edger/trimmer 10 remains in position for later use and does not interfere with the normal operation of lawnmower 200.

Thus, summarizing, an edger/trimmer 10 transfers power from vertical mower shaft 234 to a substantially horizontally disposed drive, which is connected to cutting member 24 (i.e. string trimmer, etc.) by flexible cable 50/52. Conversion of vertical drive from shaft 234 to the horizontal drive is preferably accomplished by disc 150 attached to shaft, above and out of the way of cutting blade 240 also conventionally secured to shaft 234. Contact member 70 preferably extends from outside mower housing 210, preferably through grass exhaust port or opening 216. Preferably contact member 70 is positioned substantially perpendicular to mower shaft 234 and substantially parallel to upper contact surface 152 of disc 150.

As mentioned above, substantially horizontal shaft 80 is supported within housing 72 of contact member 70 and supported by bearings, such as, but not limited to, ball bearings 84 and 92. Preferably, shaft 80 is supported such that it is centrally located or substantially at the center of housing 72. A rotating member 74, such as, but not limited to a wheel, is secured to one end of housing 72 and connect to shaft 80. Wheel 74 is raised or lowered with respect to the location of disc 150, by means of a pivot action. In one non-limiting embodiment, contact member 70 is rotatably secured to L-shaped bracket 105 which is secured to the side housing opening by a support member 108. Squeezing of activating lever 124 (and holding) case contact member 70 to be rotated with respect to bracket 105 and causes wheel 74 to contact spinning disc 150. The release of lever 124, rotates contact member 70 in the opposite direction and allows bracket to maintain contact member and wheel 74 in position above disc 150 when not in use. Shaft 80 is in communication with flexible cable 50/52 at one of its ends and the other end of cable 50/52 is in communication with string trimmer or cutting element 24. Accordingly, when lawnmower 200 is on, contact by wheel 74 with disc 150 causes wheel 74 to spin, which in turn causes shaft 80 to spin. As shaft 80 is connected, internal cable 52 also spins causes the cutting element/string trimmer 24 to also spin.

A locking mechanism can be provided with activation lever such that constant pressure on activation lever 125 is not required to maintain contact between wheel 74 and disc 150.

Contact member 70 can be approximately a ¾" tube, though other dimensions can be used and are also considered within the scope of the invention.

As is seen above, edger/trimmer 10 requires no electrical connection and is preferably entirely mechanically operated. As such, concerns for operating in water or rainy conditions are reduced, if not eliminated.

Thus the present invention provides a universal trimmer/edger attachment 10 that requires no modifications to the standard or existing lawnmower, such as but not limited to lawnmower 200. Through quick adjustments, cutting element 24 can be relatively quickly moved to various positions such as but not limited to, an edging position and/or trimming position. Furthermore, as shown above cutting element 24 can be easily moved from the left side to the right side of the lawnmower 200 and backwards through simple loosening and tightening procedures and can be easily transitioned from vertical to horizontal to any point in between. However, after initial securement of the cutting element to the front housing portion, during any further adjustments to the cutting element position, connection bracket 42 preferably remains secured at the center of front housing portion 212.

Edger/trimmer 10 allows for the grass to be cut while at the same time edged or trimmed. Preferably, edger/trimmer 10 is used with push lawnmowers, though such is not considered limiting. Edger/trimmer 10 also provides for relatively more precise trimming and edging in view of its preferred positioning of cutting element 20 at front end 212 of housing 210. As edger/trimmer 10 permits more accurate guidance, as compared to hand-held string trimmers, is should also reduce string usage to possibly increase product life.

A side cover is preferably secured to housing 210 over side aperture 216, which permits for the attachment of contact member 70 to an edge of aperture 216 and for cable 122 and cable 50 extending out of aperture 216. The cover can have a cutout area to accommodate or compensate for cables 50 and 122 and contact member 70, while covering the remaining area of aperture 216. The cover can be secured to housing 210 by any conventional means, such as, but not limited to, bolt or screw connections located at a top portion of the cover.

Though the cutting head 26 is shown with cutting strings 28. It should be recognized that the cutting head is not limited to cutting strings. Accordingly, other devices can also be used as the cutting means such as but not limited to, cutting blades and all are considered within the scope of the invention. The term "cutting element" in the claims is defined to include all types of cutting mechanisms that can be used.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A lawnmower attached edger/trimmer, the lawnmower having a housing, a handle, a power source, a cutting blade, a shaft having the cutting blade secured to a bottom end of the shaft, wherein upon activation of the power source said shaft begins to spin which in turn causes said cutting blade to spin, said lawnmower attached edger/trimmer comprising:
 a cutting member secured to the housing of a lawnmower, said cutting member having a rotatable cutting element;
 a drive member having a substantially planar upper surface secured to a blade support shaft of the lawnmower above a point where the cutting blade is secured to the shaft and below the power source;
 a contact member having a rotating portion, said contact member secured to the housing;

a first rotatable cable having a first end and a second end, said first end of the first cable secured to the cutting member and the second end of said first cable secured to said contact member;

an operating lever secured to a handle of a lawnmower;

a second cable having a first end and a second end, said first end of the second cable secured to the operating lever and a second end of the second cable secured to the contact member;

wherein upon activating power to the lawnmower the shaft begins to spin which causes said drive member to spin; wherein when the lawnmower is activated upon squeezing of said operating lever moves said contact member such that the rotating portion contacts the upper surface of said spinning drive member causing said first rotatable cable to spin which in turn causes the cutting element of said cutting member to spin.

2. The lawnmower attached edger/trimmer of claim 1 wherein further comprising an outer flexible cover which houses a majority portion of said first rotatable cable.

3. The lawnmower attached edger/trimmer of claim 1 wherein cutting element is movable from an edging position to a trimming position while said cutting member is secured to said housing.

4. The lawnmower attached edger/trimmer of claim 1 wherein said cutting member is secured to a front end of said housing without adding any apertures to said housing.

5. The lawnmower attached edger/trimmer of claim 1 wherein said drive member is a disc member secured to the shaft at its center area.

6. The lawnmower attached edger/trimmer of claim 1 wherein said contact member, said cutting member and said drive member secured to the lawnmower without requiring any modifications to the lawnmower housing.

7. The lawnmower attached edger/trimmer of claim 1 wherein said cutting element is a string style cutting element.

8. The lawnmower attached edger/trimmer of claim 1 wherein said cutting element is a blade style cutting element.

9. A lawnmower attached edger/trimmer, the lawnmower having a housing, a handle, a power source, a cutting blade, a shaft having the cutting blade secured to a bottom end of the shaft, wherein upon activation of the power source said shaft begins to spin which in turn causes said cutting blade to spin, said lawnmower attached edger/trimmer comprising:

a cutting member secured to the housing of a lawnmower, said cutting member having a rotatable cutting element;

a substantially planar member secured to a blade support shaft of the lawnmower above a point where the cutting blade is secured to the shaft;

a contact member having a rotating portion, said contact member secured to the housing;

a first rotatable cable having a first end and a second end, said first end of the first cable secured to the cutting member and the second end of said first cable secured to said contact member;

an operating lever secured to a handle of a lawnmower;

a second cable having a first end and a second end, said first end of the second cable secured to the operating lever and a second end of the second cable secured to the contact member;

wherein upon activating power to the lawnmower the shaft begins to spin which causes said planar member to spin; wherein when the lawnmower is activated upon squeezing of said operating lever moves said contact member such that the rotating portion contacts said spinning planar member causing said first rotatable cable to spin which in turn causes the cutting element of said cutting member to spin;

wherein the housing having a side opening; wherein said contact member secured to the housing at an edge of the housing side opening.

10. The lawnmower attached edger/trimmer of claim 9 wherein said contact member is adjustably secured to the housing to permit positional adjustments of the contact member for aligning rotating portion in a substantially perpendicular orientation with respect to the planar member.

11. The lawnmower attached edger/trimmer of claim 9 wherein said contact member secured to an upper edge of the housing side opening.

12. A lawnmower attached edger/trimmer, the lawnmower having a housing, a handle, a power source, a cutting blade, a shaft having the cutting blade secured to a bottom end of the shaft, the housing having an opening, wherein upon activation of the power source said shaft begins to spin which in turn causes said cutting blade to spin, said lawnmower attached edger/trimmer comprising:

a cutting member secured to a front end of a housing of a push rotary lawnmower, said cutting member having a rotatable cutting element;

a disc having a substantially planar upper surface secured to a blade support shaft of the lawnmower at its center and above a point where the cutting blade is secured to the shaft and below the power source;

a contact member having a rotating portion, said contact member secured to an edge of a housing opening;

a first rotatable cable having a first end and a second end substantially housed by a flexible outer cover, said first end of the first cable secured to the cutting member to be in communication with the cutting element and the second end of said first cable secured to said contact member to be in communication with the rotating portion;

an operating lever secured to a handle of a lawnmower;

a second cable having a first end and a second end, said first end of the second cable secured to the operating lever and a second end of the second cable secured to the contact member;

wherein upon activating power to the lawnmower the shaft begins to spin which causes said disc to spin; wherein when the lawnmower is activated upon squeezing of said operating lever moves said contact member such that the rotating portion contacts the upper surface of said spinning disc causing said first rotatable cable to spin which in turn causes the cutting element of said cutting member to spin;

wherein upon the release of the squeeze on said operating lever said contact member is automatically moved away from said spinning disc and no longer contacts said spinning disc.

13. The lawnmower attached edger/trimmer of claim 12 wherein cutting element is movable from an edging position to a trimming position while said cutting member is secured to said housing.

14. The lawnmower attached edger/trimmer of claim 12 wherein said contact member, said cutting member and said disc secured to the lawnmower without requiring any modifications to the lawnmower housing.

15. The lawnmower attached edger/trimmer of claim 12 wherein said cutting element is a string style cutting element.

16. The lawnmower attached edger/trimmer of claim 12 wherein said cutting element is a blade style cutting element.

17. A lawnmower attached edger/trimmer, the lawnmower having a housing, a handle, a power source, a cutting blade, a shaft having the cutting blade secured to a bottom end of the shaft, the housing having an opening, wherein upon activation of the power source said shaft begins to spin which in turn causes said cutting blade to spin, said lawnmower attached edger/trimmer comprising:

a cutting member secured to a front end of a housing of a push rotary lawnmower, said cutting member having a rotatable cutting element;

a substantially planar member secured to a blade support shaft of the lawnmower at its center and above a point where the cutting blade is secured to the shaft;

a contact member having a rotating portion, said contact member secured to an edge of a housing opening;

a first rotatable cable having a first end and a second end substantially housed by a flexible outer cover, said first end of the first cable secured to the cutting member to be in communication with the cutting element and the second end of said first cable secured to said contact member to be in communication with the rotating portion;

an operating lever secured to a handle of a lawnmower;

a second cable having a first end and a second end, said first end of the second cable secured to the operating lever and a second end of the second cable secured to the contact member;

wherein upon activating power to the lawnmower the shaft begins to spin which causes said planar member to spin;

wherein when the lawnmower is activated upon squeezing of said operating lever moves said contact member such that the rotating portion contacts said spinning planar member causing said first rotatable cable to spin which in turn causes the cutting element of said cutting member to spin;

wherein the housing opening is a side opening; wherein said contact member secured at an edge of the housing side opening.

18. The lawnmower attached edger/trimmer of claim 17 wherein said contact member is adjustably secured to the housing to permit positional adjustments of the contact member for aligning rotating portion in a substantially perpendicular orientation with respect to the planar member.

19. The lawnmower attached edger/trimmer of claim 18 wherein said contact member secured to an upper edge of the housing side opening.

20. A lawnmower attached edger/trimmer, the lawnmower having a housing, a handle, a power source, a cutting blade, a shaft having the cutting blade secured to a bottom end of the shaft, the housing having a side opening, wherein upon activation of the power source said shaft begins to spin which in turn causes said cutting blade to spin, said lawnmower attached edger/trimmer comprising:

a cutting member secured to a front end of a housing of a push rotary lawnmower, said cutting member having a rotatable cutting element, when said cutting member is secured to the front end of the housing said rotatable cutting element remains movable back and forth from an edging position to a trimming position;

a substantially planar disc secured to a blade support shaft of the lawnmower at its center and above a point where the cutting blade is secured to the shaft;

a contact member having a rotating portion, said contact member secured to an upper edge of a side opening in said housing;

a first rotatable cable having a first end and a second end substantially housed by a flexible outer cover, said first end of the first cable secured to the cutting member to be in communication with the cutting element and the second end of said first cable secured to said contact member to be in communication with the rotating portion;

an operating lever secured to a handle of a lawnmower;

a second cable having a first end and a second end, said first end of the second cable secured to the operating lever and a second end of the second cable secured to the contact member;

wherein upon activating power to the lawnmower the shaft begins to spin which causes said planar member to spin;

wherein when the lawnmower is activated upon squeezing of said operating lever moves said contact member such that the rotating portion contacts said spinning planar member causing said first rotatable cable to spin which in turn causes the cutting element of said cutting member to spin;

wherein said contact member, said cutting member and said planar member secured to the lawnmower without requiring any modifications to the lawnmower housing.

21. The lawnmower attached edger/trimmer of claim 20 wherein said contact member is adjustably secured to the housing to permit positional adjustments of the contact member for aligning rotating portion in a substantially perpendicular orientation with respect to the planar member.

22. The lawnmower attached edger/trimmer of claim 20 wherein said cutting element is a string style cutting element.

23. The lawnmower attached edger/trimmer of claim 20 wherein said cutting element is a blade style cutting element.

24. The lawnmower attached edger/trimmer of claim 20 wherein said rotary lawnmower powered by an internal combustion engine.

25. The lawnmower attached edger trimmer of claim 20 wherein said rotary lawnmower powered by an electric motor.

* * * * *